Oct. 22, 1935.    H. W. HARTMAN ET AL    2,018,303
ELECTRICAL CONDUIT SYSTEM
Original Filed Aug. 22, 1933    2 Sheets-Sheet 1

Inventors
Howard W. Hartman
and James F. Brown

By Seymour & Bright
Attorneys

Oct. 22, 1935.   H. W. HARTMAN ET AL   2,018,303
ELECTRICAL CONDUIT SYSTEM
Original Filed Aug. 22, 1933   2 Sheets-Sheet 2

Inventors
Howard W. Hartman
AND James F. Brown
By Seymour & Bright
Attorneys

Patented Oct. 22, 1935

2,018,303

UNITED STATES PATENT OFFICE 2,018,303

ELECTRICAL CONDUIT SYSTEM

Howard W. Hartman, South Williamsport, and James F. Brown, Williamsport, Pa.; said Brown assignor to said Hartman Original application August 22, 1933, Serial No. 686,294. Divided and this application March 10, 1934, Serial No. 715,014

6 Claims. (Cl. 247—3)

This invention relates to improvements in electrical conduit systems, and the present application is a division of our application Serial No. 686,294, filed August 22, 1933.

An object is to furnish means to permit the running of various circuits parallel with and adjacent to the system, the whole forming a compact unitary construction.

A further object is to provide means for running various circuits parallel with and adjacent to the system in methods known as surface, concealed, or a novel combination of both.

A still further object is to supply metal trim in which circuits may be concealed, such trim being made up mainly of standard metal stampings, so as to permit of various arrangements to accommodate baseboards, panels, wainscots, etc.

With the foregoing objects outlined and with other objects in view which will appear as the description proceeds, the invention consists in the novel features hereinafter described in detail, illustrated in the accompanying drawings and more particularly pointed out in the appended claims.

Figure 1:
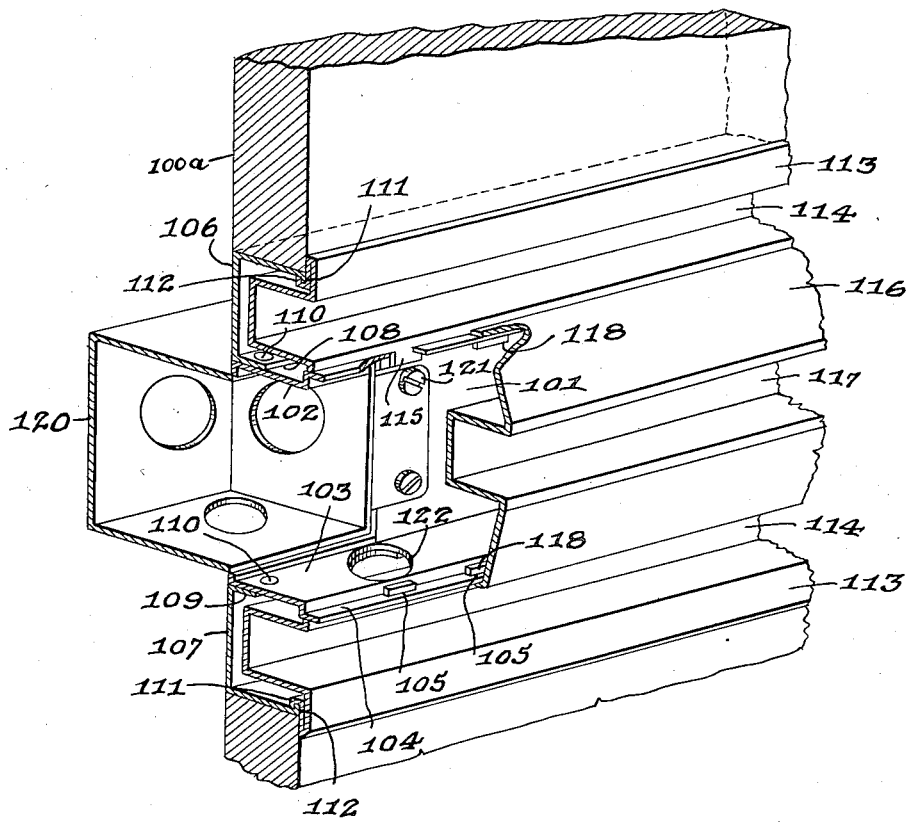
Fig. 1 is a partly perspective and partly sectional view of a concealed channel wire race way to accommodate a conduit system and designed for panel, trim or wainscot.
Figure 2:
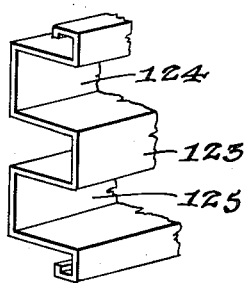
Fig. 2 is a fragmentary perspective view of a double channel confronting plate which may be substituted for the single channel plate shown in Fig. 1.
Figure 4:
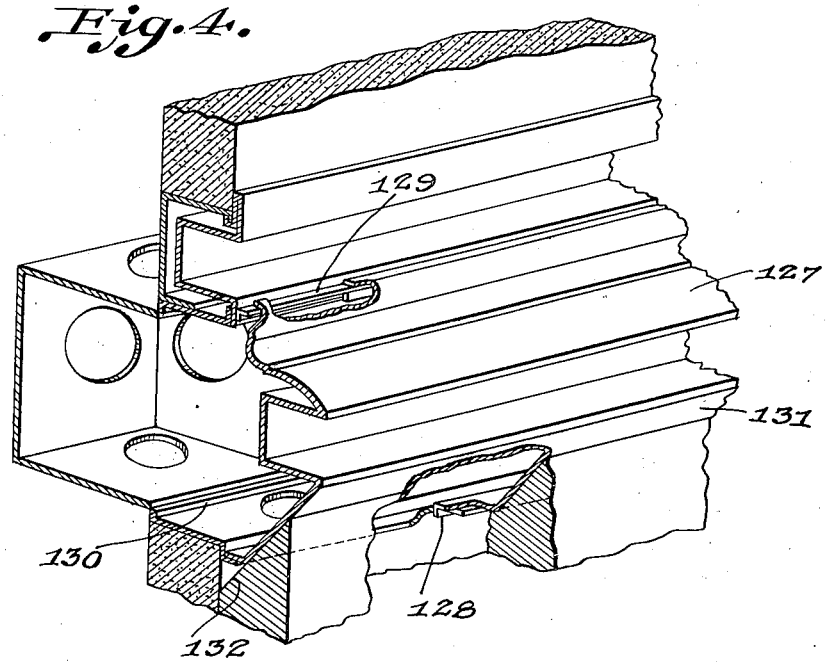
Figs. 4 and 5 are views similar to Fig. 1 but showing race ways designed for baseboards or trim.
Figure 5:
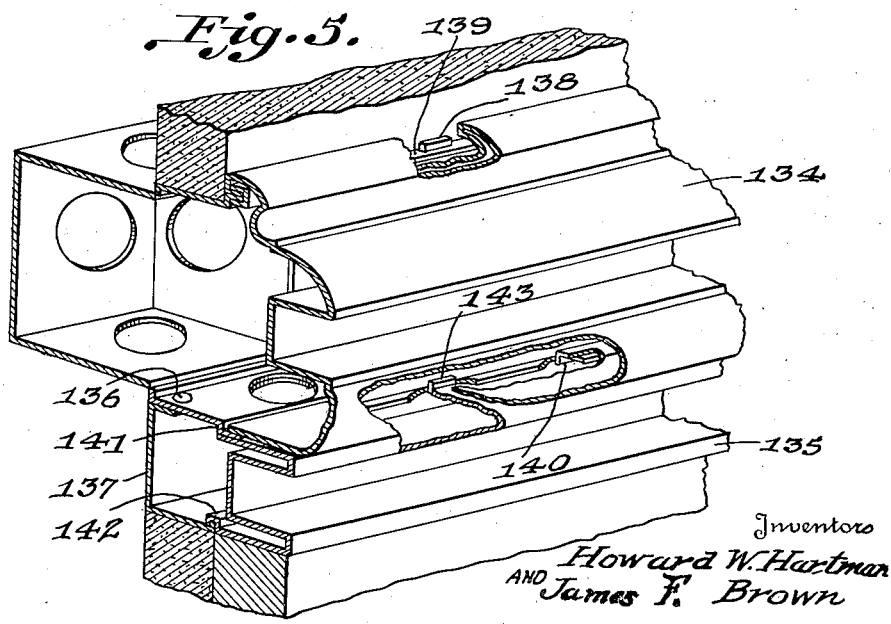

In the concealed channel wire race ways with flush and surface confronting or cover plates designed to accommodate a conduit system, the structure in Figs. 1 and 2, has been designed for panel, trim or wainscot, while the ones shown in Figs. 4 and 5 will accommodate baseboards or trim as shown. The advantages of these arrangements will be readily appreciated as the combinations shown are readily built from standardized channel irons, the differences residing mainly in the configuration of the confronting or cover plates.

In Fig. 1 the main or intermediate channel 100 of the raceway has a rear web 101, a top wing 102 and a bottom wing 103, and each wing projects forwardly and terminates in an L-shaped flange 104 which is apertured at spaced points 105 for a purpose hereinafter described.

Arranged above and below the intermediate channel are upper and lower raceway channels respectively numbered 106 and 107. These channels are identical in construction but the upper one has its short wing 108 at the bottom while the lower one has its short wing 109 uppermost. These short wings are secured to the wings of the channel 100 by any suitable means such as rivets 110. The long wings of the channels 106 and 107 terminate in flanges 111 designed to interlock with hook shaped extremities 112 at one edge of flush confronting or cover plates 113. Each of these plates may have an inwardly extending channel 114 to receive a conductor element or connector units not shown. Each plate 113 has spaced lugs 115 at its opposite extremity to snap into the apertures 105 under the influence of the resiliency of the metal of which the plate 113 is formed.

Another confronting or cover plate 116 is designed to close the mouth of the intermediate channel and this plate may also be provided with a channel 117 to accommodate our conductor system. The opposite edges of the plate 116 has spaced lugs 118 designed to snap into some of the apertures 105 of the flanges or wings 103, 104 of the intermediate channel for the purpose of detachably locking the plate 116 in position. Obviously the various channels in the rear of the confronting plates can accommodate conductor cables and insulated wires, and by arranging an aperture in the web 101 of the main channel, a conventional outlet box 120 may be connected to the main channel by means of screws 121 or the like. Holes 122 provided at intervals in both wings of the channel 100 permit tapping the running wires in the channels 106, 107 adjacent to the central channel.

Of course, the raceway channels 100, 106, and 107 are arranged in a wall or similar structure 100a.

In Fig. 2 we have illustrated a confronting or cover plate 123 which may be used in place of the plate 116. In this instance the plate has two channels 124 and 125 instead of the single channel 117 shown in Fig. 1.

Figure 3:
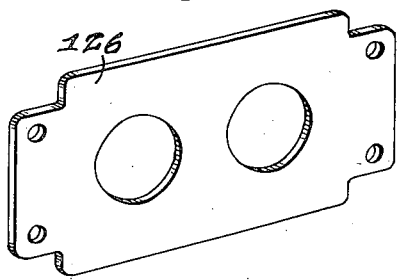
Fig. 3 is a perspective view of an apertured plate which may be used with such race way where a heavier conduit box might be inadvisable or prohibited.

An apertured plate 126 (Fig. 3) may be used in place of an outlet box where such box might be inadvisable or prohibitive.

In Fig. 4 the structure is similar to that of Fig. 1 with the exception that the lower channel 107 and its confronting or cover plate 113 are omitted and a special type of confronting plate 127 for the central channel is used in place of the plate 126. However the plate 127 is secured in position in the same manner as the plate 116, that is, it has spaced lugs 128 to enter the apertures of the L-shaped flanges 129 at the edges of the wings of the main channel 130, and the lower portion 131 of the confronting plate may be inclined downwardly and inwardly so as to snugly engage the inclined surface 132 of a baseboard 133 or the like.

The structure shown in Fig. 5 is also similar to that of Fig. 1 with the exception that the upper channel 106 and its confronting plate 113 are omitted, and special confronting plates 134 and 135 are provided for the central channel 136 and the lower channel 137. In this instance the upper edge portion of the plate 134 has upwardly extending lugs 138 to interlock with the apertures in the upper edge 139 of the main channel, and the lower edge portion of this plate has downwardly extending lugs 140 to interlock with the apertures in the lower edge 141 of the main channel.

The plate 135 in this embodiment has a hook-shaped part 142 at its lower edge to hook over the flange of the lower channel and its upper edge has lugs 143 to enter the apertures in the flange 141 of the main channel.

When the race way system is originally installed, or at any future time, circuits may be run in the race ways and used to feed electric outlets, such as side brackets, switches, ceiling lights, etc. and fished in the walls and partitions by concealed methods. In the concealed channel race ways as described the cover can be blank over space that may or may not have the conductor channel, and which perhaps is not being used for the conductor system. In metal race ways the rear channel may be grounded in the field, and the confronting plate forming a continuous surface is automatically grounded. Blank cover pieces can be used to cover the face of the race ways when partitions are to be set at right angles to walls, such as when changing office partitions to suit different tenants. Obviously in the race way system the confronting plate may be furnished to conform to any scheme of interior decoration. In the race ways the space that the conduit system does not occupy, can be used and also sectionalized for different carrying systems. Apertures may be used in the confronting plate at any desired point which the system may require.

While we have disclosed what we now consider to be some preferred embodiment of the invention we are aware that changes may be made in the details disclosed without departing from the spirit of the invention as expressed in the claims.

What we claim and desire to secure by Letters Patent is:

1. In a structure of the character described, a main channel provided with forwardly projecting legs, each leg terminating in an apertured flange, a second channel arranged in superposed relation with respect to the main channel and having a short leg secured to one leg of the main channel, the second channel also having a long leg terminating in a flange, a flush confronting plate having one of its edges of hook-shape and engaging the last mentioned flange, the opposite edge of the confronting plate being provided with spaced lugs which are interlocked with one of the legs of the main channel, and another surface confronting plate having edge portions provided with projecting lugs detachably interlocked with the flanges of the main channel.

2. In a structure of the character described, a main channel provided with forwardly projecting legs, each leg terminating in an apertured flange, a second channel arranged in superposed relation with respect to the main channel and having a short leg secured to one leg of the main channel, the second channel also having a long leg terminating in a flange, a flush confronting plate having one of its edges of hook-shape and engaging the last mentioned flange, the opposite edge of the confronting plate being provided with spaced lugs which are interlocked with one of the legs on the main channel, and another surface confronting plate having edge portions provided with projecting lugs detachably interlocked with the flanges of the main channel, one of said plates being provided with a channel to receive a conduit system.

3. In an outlet system for electrical conduits, a wall, metallic raceways concealed in the wall, cover plates covering said raceways and forming with the latter flush and surface conduit channels, and means for interlocking each of said plates to its respective raceway.

4. In an outlet system for electrical conduits, a wall, metallic raceways concealed in said wall, cover plates covering said raceways and forming with said raceways flush and surface channels, each of said plates having resilient legs extending in the same general direction and detachably interlocked with its respective raceway.

5. In an outlet system for electrical conduits a wall, metallic raceways concealed in said wall and having forwardly extending flanges, cover plates covering said raceways and forming with the latter flush and surface conduit channels, each of said plates having resilient legs extending rearwardly and detachably interlocked with the flanges of its respective raceway.

6. In an outlet system for electrical conduits, a wall, a metallic raceway concealed in said wall and having forwardly projecting flanges, a cover plate for said raceway shaped to form an external channel, said cover plate being also provided with resilient flanges, some of said flanges being provided with apertures and the other flanges having projecting lugs to detachably interlock with the apertured flanges.

HOWARD W. HARTMAN.
JAMES F. BROWN.